United States Patent
Miyoshi et al.

(10) Patent No.: US 10,066,084 B2
(45) Date of Patent: Sep. 4, 2018

(54) STAMPABLE SHEET

(71) Applicant: Toray Industries, Inc., Tokyo (JP)

(72) Inventors: Katsuhiro Miyoshi, Nagoya (JP); Takashi Shimada, Otsu (JP); Takafumi Hashimoto, Nagoya (JP); Tetsuya Ohara, Otsu (JP); Yoshihiro Naruse, Nagoya (JP)

(73) Assignee: Toray Industries, Inc. (JP)

( * ) Notice: Subject to any disclaimer, the term of this patent is extended or adjusted under 35 U.S.C. 154(b) by 478 days.

(21) Appl. No.: 14/763,188

(22) PCT Filed: Feb. 19, 2014

(86) PCT No.: PCT/JP2014/053905
§ 371 (c)(1),
(2) Date: Jul. 24, 2015

(87) PCT Pub. No.: WO2014/129497
PCT Pub. Date: Aug. 28, 2014

(65) Prior Publication Data
US 2015/0353713 A1    Dec. 10, 2015

(30) Foreign Application Priority Data
Feb. 21, 2013 (JP) .................. 2013-032191

(51) Int. Cl.
B29C 70/14    (2006.01)
B29C 70/22    (2006.01)
(Continued)

(52) U.S. Cl.
CPC .................. *C08K 7/06* (2013.01); *C08J 5/042* (2013.01); *D04H 1/4242* (2013.01); *D04H 1/60* (2013.01);
(Continued)

(58) Field of Classification Search
CPC ....... C08J 5/042; C08J 5/24; C08J 5/04; C08J 5/10; D04H 1/4242; D04H 1/74;
(Continued)

(56) References Cited

U.S. PATENT DOCUMENTS

2010/0178495 A1*  7/2010  Taketa .................. B29C 70/14
                                                        428/339

FOREIGN PATENT DOCUMENTS

JP    2000-141522 A    5/2000
JP    2002-212311 A    7/2002
(Continued)

*Primary Examiner* — Camie S Thompson
(74) *Attorney, Agent, or Firm* — DLA Piper LLP (US)

(57) ABSTRACT

A stampable sheet includes a resin and carbon fiber sheet including fiber bundles of discontinuous carbon fibers, wherein the carbon fiber sheet includes fiber bundles having a bundle width of 50 µm or greater and opened fibers ranging from fiber bundles having a bundle width less than 50 µm to fibers obtained by opening to the single-fiber level. When the direction along which the opened fibers have been oriented most is a 0° direction and the range of from the 0° to 90° direction is divided into angular zones, the distribution curve showing the proportion of the number of fiber bundles in each angular zone to that in all angular zones and the distribution curve showing the proportion of the number of opened fibers in each angular zone to that in all angular zones are reverse to each other in terms of gradient of the 0° to 90° direction.

13 Claims, 5 Drawing Sheets

(51) Int. Cl.
  *C08K 7/06*    (2006.01)
  *C08J 5/04*    (2006.01)
  *D04H 1/4242*  (2012.01)
  *D04H 1/60*    (2006.01)
  *D04H 1/74*    (2006.01)

(52) U.S. Cl.
  CPC ............ *D04H 1/74* (2013.01); *C08J 2377/00* (2013.01); *Y10T 428/24994* (2015.04)

(58) Field of Classification Search
  CPC ... D04H 1/60; Y10T 428/24994; B29B 11/16; B29B 15/08; B29B 15/14; B29C 70/14; B29C 70/22
  USPC ...................................... 428/401, 339, 297.4
  See application file for complete search history.

(56) References Cited

FOREIGN PATENT DOCUMENTS

| | | |
|---|---|---|
| JP | 2004-043985 A | 2/2004 |
| JP | 2010-235779 A | 10/2010 |
| JP | 2012-127044 A | 7/2012 |
| WO | 2012/165076 A1 | 12/2012 |
| WO | 2013/118689 A1 | 8/2013 |

* cited by examiner

Example 1

Example 2

Comparative Example 1

STAMPABLE SHEET

TECHNICAL FIELD

This disclosure relates to a stampable sheet comprising carbon fibers and a resin and, specifically, to a stampable sheet making it possible to easily mold a CFRP (Carbon Fiber Reinforced Plastic) having isotropic and high mechanical properties with an excellent flowability and can be molded into a complex shape.

BACKGROUND

In a stampable sheet wherein a paper or nonwoven fabric comprising carbon fibers is impregnated with a resin, although the mechanical properties (mechanical properties of the molded article) are excellent, flowability at the time of molding is low and moldability is poor. This is because the carbon fibers, which are reinforcing fibers, are dispersed and therefore a stress is hard to be concentrated and, while the reinforcing effect due to the carbon fibers is sufficiently exhibited, the carbon fibers are crossed with respect to each other to thereby restrict their movements. Therefore, the carbon fibers become hard to be moved (for example, the press molding described in JP-A-2010-235779).

Further, sometimes a carding machine is used to prepare a carbon fiber sheet used for a stampable sheet. However, in a nonwoven fabric prepared by ordinary carding, because fibers are likely to be oriented along the rotational direction of the cylinder roll of the carding machine and, consequently, the anisotropy becomes high, it is often required to perform a complex lamination such as quasi-isotropic lamination to obtain a component requiring an isotropy.

Therefore, with regard to an objective of a stampable sheet to secure excellent flowability at the time of molding to realize a satisfactory moldability while securing high mechanical properties of a molded article, it is difficult to achieve the objective by using a conventional stampable sheet applied with no particular device.

Accordingly, in view of the above-described circumstances, it could be helpful to provide a stampable sheet making it possible for a molded article to exhibit high mechanical properties with an excellent isotropy, and making it possible to easily mold a desired CFRP with a satisfactory moldability as a result of excellent flowability.

SUMMARY

We thus provide:

A stampable sheet comprising a resin and a carbon fiber sheet constituted of fiber bundles of discontinuous carbon fibers, and is characterized in that the carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon sheet in which, when a direction along which the opened fibers (B) have been oriented most is taken as a 0° direction and a range of from the 0° direction to a 90° direction is divided into a predetermined plurality of angular zones (a total number N of the angular zones: N≥3), a distribution curve showing a proportion of a number of the fiber bundles (A) in each angular zone to a number of all fiber bundles (A) in all angular zones and a distribution curve showing a proportion of a number of the opened fibers (B) in each angular zone to a number of all opened fibers (B) in all angular zones are reverse to each other in terms of gradient viewed as a whole in a range of from the 0° direction to the 90° direction.

In such a stampable sheet, because the carbon fiber sheet contains the fiber bundles (A) having a bundle width of 50 μm or more, it becomes less frequent for the carbon fibers to be crossed with respect to each other to restrict their movements, and flowability at the time of molding is improved. On the other hand, because the carbon fiber sheet contains the opened fibers (B) ranging from fiber bundles having a bundle width less than 50 μm to fibers obtained by opening to a single-fiber level, a satisfactory dispersion of the carbon fibers is also secured, stress is hard to be concentrated, and high mechanical properties of a molded article can be secured. Further, because the fiber bundles (A) and the opened fibers (B) are configured to be distributed with an appropriate balance so that a distribution curve showing a proportion of the number of the fiber bundles (A) in each angular zone to the number of all fiber bundles (A) in all angular zones and a distribution curve showing a proportion of the number of the opened fibers (B) in each angular zone to the number of all opened fibers (B) in all angular zones are reverse with respect to each other in terms of gradient viewed as a whole, namely, because the fiber bundles (A) and the opened fibers (B) are oriented in respective directions different from each other with an appropriate balance, isotropic properties are exhibited as a stampable sheet, and by molding the stampable sheet without complex lamination, desired mechanical properties can be exhibited with an excellent isotropy also as a molded article. Therefore, while high mechanical properties of a molded article can be exhibited with an excellent isotropy, a desired CFRP can be easily molded with a satisfactory moldability as a result of an excellent flowability.

In the above-described stampable sheet, it is preferred that the above-described total number N of the angular zones is 6 to 12. Namely, when the total number N of the angular zones is 6, the range from the 0° direction to the 90° direction is divided into 6 angular zones each having an angle of 15°, and when the total number N of the angular zones is 12, the range from the 0° direction to the 90° direction is divided into 12 angular zones each having an angle of 7.5°. When the total number N of the angular zones is within such a range, it becomes possible to determine more clearly whether the above-described distribution curve showing the proportion of the number of the fiber bundles (A) in each angular zone to the number of all fiber bundles (A) in all angular zones and the distribution curve showing the proportion of the number of the opened fibers (B) in each angular zone to the number of all opened fibers (B) in all angular zones are reverse to each other in terms of gradient viewed as a whole.

With regard to the above-described total number N of the angular zones, although it may be 3 or more, in particular, when the total number N of the angular zones is 9, because the range from the 0° direction to the 90° direction can be divided into 9 angular zones each having an angle of 10°, the range of each angular zone becomes extremely distinct, the gradient viewed as a whole can also be determined clearly.

It is preferred that a principal orientation angle of the above-described fiber bundles (A), at which a distribution showing the proportion of the number of the fiber bundles (A) in each angular zone to the number of all fiber bundles (A) in all angular zones exhibits a highest value, is in a 60° direction to the 90° direction relative to the 0° direction along which the opened fibers (B) have been oriented most. Such a configuration makes it possible to align the fiber bundles (A) and the opened fibers (B) in respective directions different from each other with an appropriate balance in every angular zone, and thus makes it possible to further improve the isotropy.

Further, it is preferred that a proportion of the number of the above-described fiber bundles (A) in an angular zone including the 0° direction to the number of all fiber bundles (A) in all angular zones is in a range of 0 to 1.0×90/N %, and it is preferred that a proportion of the number of the above-described opened fibers (B) in the angular zone including the 0° direction to the number of all opened fibers (B) in all angular zones is in a range of 1.0×90/N to 3.0×90/N %, wherein N is the total number of the angular zones. Such a configuration makes it possible to further improve the isotropy over the entire stampable sheet.

Furthermore, it is preferred that a proportion of the number of the above-described fiber bundles (A) in an angular zone including the 90° direction to the number of all fiber bundles (A) in all angular zones is in a range of 1.0×90/N to 3.0×90/N %, and a proportion of the number of the above-described opened fibers (B) in the angular zone including the 90° direction to the number of all opened fibers (B) in all angular zones is in a range of 0 to 1.0×90/N %, wherein N is the total number of the angular zones. Such a configuration makes it possible to further improve the isotropy over the entire stampable sheet.

Further, when tensile elastic moduli are measured in respective angular directions, with regard to average value of tensile elastic moduli, it is preferred that 'an average value of tensile elastic moduli in an angular direction in which the average value exhibits a maximum value/an average value of tensile elastic moduli in an angular direction in which the average value exhibits a minimum value' is 1.2 to 1.0. Such a configuration makes it possible to improve the isotropy of tensile elastic modulus among the mechanical properties over the entire stampable sheet.

Furthermore, when tensile strengths are measured in respective angular directions, with regard to average value of tensile strengths, it is preferred that 'an average value of tensile strengths in an angular direction in which the average value exhibits a maximum value/an average value of tensile strengths in an angular direction in which the average value exhibits a minimum value' is 1.2 to 1.0. Such a configuration makes it possible to improve the isotropy of tensile strength among the mechanical properties over the entire stampable sheet.

Further, it is preferred that a proportion Y of carbon fiber bundles (C) having an Mn/(Ln×D) of $8.5×10^{-1}$ (mg/mm²) or greater in discontinuous carbon fiber bundles to the total weight of the discontinuous carbon fiber bundles is $30 \leq Y < 90$ (wt %), wherein Mn: weight of carbon fiber bundles (mg), Ln: fiber length of carbon fibers (mm), D: fiber diameter of carbon fibers (mm). Such a configuration makes it possible to obtain a high flowability at the time of molding using this stampable sheet, and makes it possible for the molded article to realize high mechanical properties having a small range of variation, for example, to exhibit an excellent adaptability of carbon fibers for small parts such as ribs.

Furthermore, it is preferred that a proportion of the number of the above-described fiber bundles (A) in an angular zone including a 45° direction to the number of all fiber bundles (A) in all angular zones is 0.5×90/N to 1.5×90/N %, and it is preferred that a proportion of the number of the above-described opened fibers (B) in the angular zone including the 45° direction to the number of all opened fibers (B) in all angular zones is 0.5×90/N to 1.5×90/N %, wherein N is the total number of the angular zones. Such a configuration makes it possible to realize the aforementioned excellent isotropy more securely.

Such a carbon fiber sheet as described above can be prepared, in particular, by carding method. The carding method and an example of a machine for the method will be explained later. However, it is also possible to employ an air laid method other than the carding method to prepare the above-described carbon fiber sheet.

Further, when tensile strengths are measured in respective angular directions, it is preferred that the CV value (the value of coefficient of variance) of tensile strengths is in a range of 5 to 0.1%. Such a configuration makes it possible to realize mechanical properties (tensile strengths) having small variation over the entire stampable sheet.

Further, when tensile elastic moduli are measured in respective angular directions, it is preferred that the CV value of tensile elastic moduli is 5 to 0.1%. Such a configuration makes it possible to realize mechanical properties (tensile elastic moduli) having small variation over the entire stampable sheet.

Furthermore, it is preferred that the above-described discontinuous carbon fibers comprise carbon fibers having a fiber length of 2 mm or more and less than 20 mm. By controlling the fiber length of carbon fibers in such a range, it becomes possible to secure an excellent flowability.

Thus, in the stampable sheet, it is possible to exhibit high mechanical properties with an excellent isotropy, and also possible to easily mold a desired CFRP, even into a complex shape, with a satisfactory moldability as a result of an excellent flowability.

EXPLANATION OF SYMBOLS

Figure 1:
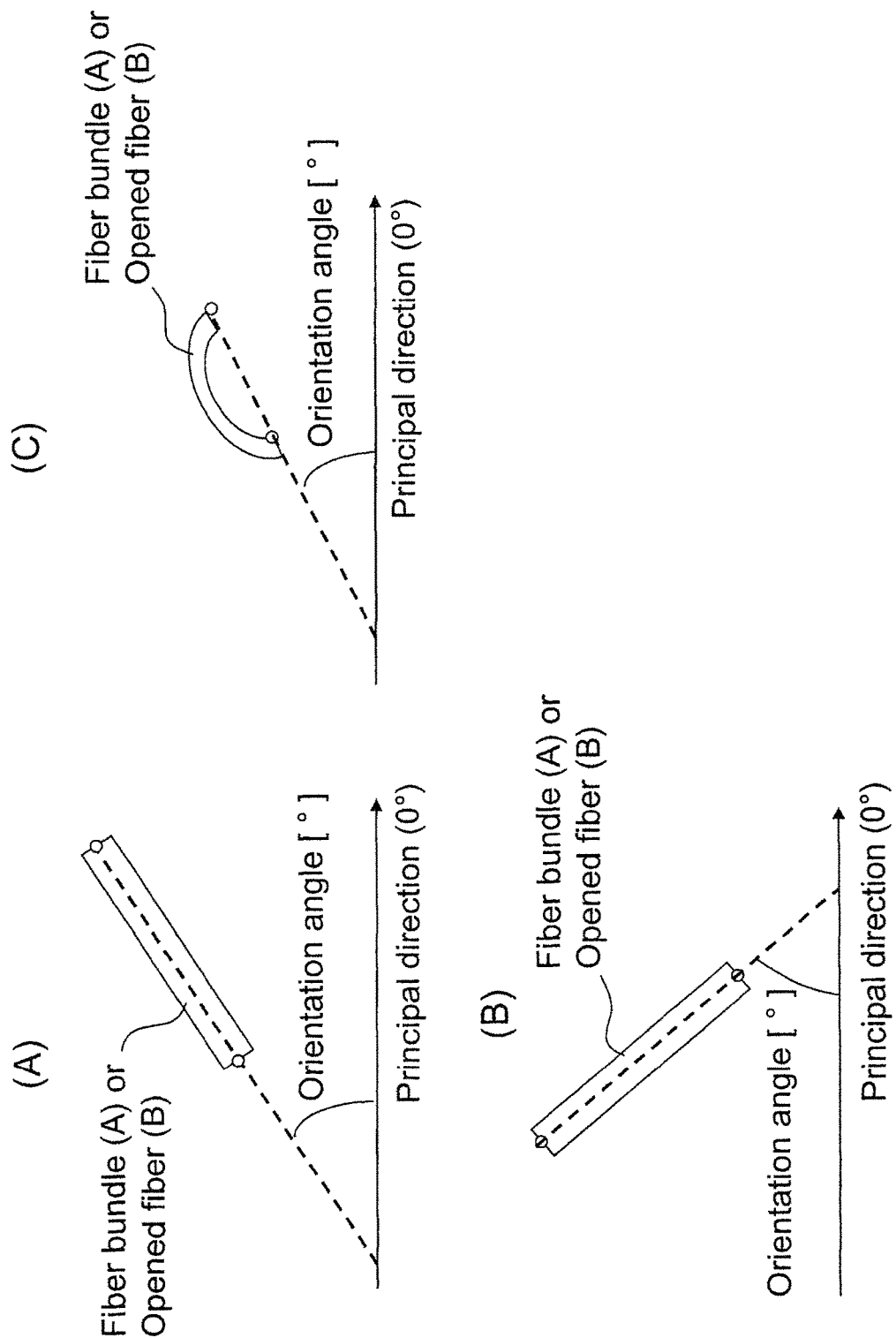
FIG. 1 is an explanatory diagram showing a method of measuring the orientation angle of a carbon fiber.

1: carding machine
2: cylinder roll
3: take-in roll
4: doffer roll
5: worker roll
6: stripper roll
7: feed roll
8: belt conveyer
9: fiber bundle of discontinuous carbon fiber
10: sheet-like web

DETAILED DESCRIPTION

Hereinafter, our stampable sheets will be explained together with Examples and Comparative Examples.

We provide a stampable sheet of carbon fiber composite material comprising a resin and a carbon fiber sheet constituted of fiber bundles of discontinuous carbon fibers, and is characterized in particular by the configuration of the carbon fiber sheet. First, a matrix resin used in a process of preparing the carbon fiber composite material will be explained. With regard to this matrix resin, a thermoplastic resin is preferably used. Material of the thermoplastic matrix resin is not particularly restricted, and can be appropriately selected within a range that does not greatly reduce the mechanical properties of a finally molded carbon fiber reinforced plastic. As examples, a polyolefin-based resin such as polyethylene and polypropylene, a polyamide-based resin such as nylon 6 and nylon 6,6, a polyester-based resin such as polyethylene terephthalate and polybutylene terephthalate, a polyetherketone, a polyethersulfone or an aromatic polyamide can be used. Further, for example, it is preferred that the thermoplastic matrix resin comprises at least one type selected from the group consisting of polyamide, polyphenylene sulfide, polypropylene, polyetheretherketone and a phenoxy resin.

Figure 2:
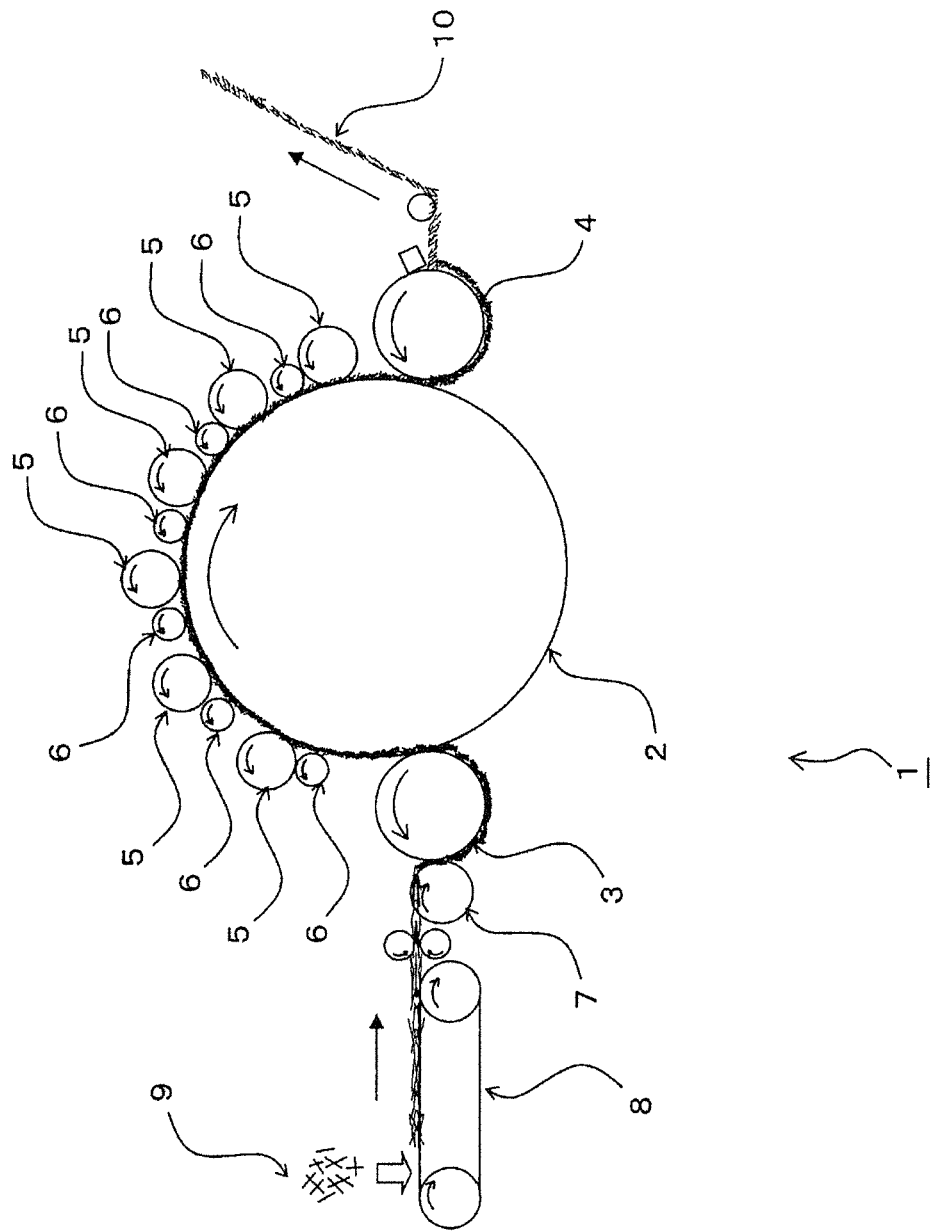
FIG. 2 is a schematic diagram showing an example of a carding machine.

Further, to realize the carbon fiber sheet, it is preferred that the carbon fiber sheet is prepared by the carding method. FIG. 2 shows an example of a carding machine to carry out the carding method. The process of preparing the carbon fiber sheet by the carding method is not particularly restricted, and a general apparatus can be used therefor. For example, as shown in FIG. 2, carding machine 1 mainly comprises a cylinder roll 2, a take-in roll 3 provided at an upstream side and closely to the outer circumferential surface of the cylinder roll 2, a doffer roll 4 provided closely to the outer circumferential surface of the cylinder roll 2 at a downstream side which is a side opposite to the side of the take-in roll 3, a plurality of worker rolls 5 provided closely to the outer circumferential surface of the cylinder roll 2 between the take-in roll 3 and the doffer roll 4, stripper rolls 6 provided closely to the worker rolls 5, a feed roll 7 provided closely to the take-in roll 3, and a belt conveyer 8.

Fiber bundles 9 of discontinuous carbon fibers are supplied to belt conveyer 8, and the carbon fiber bundles 9 are introduced onto the outer circumferential surface of cylinder roll 2 through the outer circumferential surface of feed roll 7 and then through the outer circumferential surface of take-in roll 3. Up to this stage, the carbon fiber bundles are opened to some extent and become floc-like aggregates of carbon fiber bundles. Although a part of the floc-like aggregates of carbon fiber bundles introduced onto the outer circumferential surface of cylinder roll 2 wind around the outer circumferential surface of worker roll 5, these carbon fibers are stripped off by stripper rolls 6 and returned again onto the outer circumferential surface of the cylinder roll 2. Many needles, projections exist at standing conditions on the outer circumferential surfaces of the respective rolls of feed roll 7, take-in roll 3, cylinder roll 2, worker rolls 5 and stripper rolls 6, and in the above-described steps, by the operation of the needles, the carbon fiber bundles are opened into predetermined-condition bundles, and oriented to some extent. The carbon fiber bundles, opened into predetermined-condition bundles through such steps, move onto the outer circumferential surface of doffer roll 4 as a sheet-like web 10 which is one form of the carbon fiber aggregates.

When such a carding is carried out, it is preferred to control the time (residence time), during which carbon fibers reside in the carding machine to be short for the purpose of preventing the carbon fibers from being folded. Concretely, it is preferred to transfer the carbon fibers existing on the wires wound onto a cylinder roll of the carding machine to a doffer roll in a time as short as possible. Therefore, to accelerate such a transfer, it is preferred to rotate the cylinder roll at a high rotational speed, for example, such as 150 rpm or higher. Further, from a similar reason, the surface speed of the doffer roll is preferably a high speed, for example, such as 10 m/min. or higher.

Further, in the above-described carding method, to prevent the carbon fibers from fracturing, it is preferred that thermoplastic resin fibers and/or thermoplastic resin particles are contained in aggregates of carbon fibers. In other words, although the carbon fiber sheet may be formed of only carbon fibers, thermoplastic resin fibers and/or thermoplastic resin particles can also be contained. Because carbon fibers are rigid and fragile, they are hard to be tangled up together and liable to break. Therefore, there is a problem in the carbon fiber sheet formed of only carbon fibers that, during production of the sheet, it is easily cut or the carbon fibers are liable to fall off. In the carding method, by containing thermoplastic resin fibers which are flexible, hard to break and liable to be tangled up, carbon fiber aggregates having a high uniformity can be formed. When thermoplastic resin fibers are contained in carbon fiber aggregates, the content of carbon fibers in the carbon fiber aggregates is preferably 20 to 95 mass %, more preferably 50 to 95 mass %, and further preferably 70 to 95 mass %. If the content of carbon fibers is low, it becomes difficult to obtain high mechanical properties when a carbon fiber composite material is formed. On the other hand, if the content of thermoplastic resin fibers is too low, the above-described advantage of improving the uniformity of the carbon fiber aggregates cannot be obtained.

Further, when thermoplastic resin fibers are contained in carbon fiber aggregates, the fiber length of the thermoplastic resin fibers are not particularly restricted as long as the length is within a range in which it is possible to keep the form of carbon fiber aggregates or preventing carbon fibers from falling off and, generally, thermoplastic resin fibers having a fiber length of approximately 3 to 100 mm can be used. It is also possible to decide the fiber length of thermos-plastic resin fibers in accordance with and in proportion to the fiber length of carbon fibers.

Further, in the above-described carding method, it is preferred to provide a crimp to the thermoplastic resin fibers for the objective of enhancing the effect of tangle due to the thermoplastic resin fibers. The degree of the crimp is not particularly limited as long as the degree is within a range in which it is possible to achieve the objective and, generally, it is possible to use thermoplastic resin fibers having a number of crimps in a range of approximately 5 to 25 crests per 25 mm and a rate of crimp in a range of approximately 3 to 30%.

The material for the above-described thermoplastic resin fibers is not particularly restricted, and can be appropriately selected within a range that does not greatly reduce the mechanical properties when formed into a molded article of carbon fiber composite material. As an example, fibers prepared by spinning a resin such as a polyolefin-based resin such as polyethylene and polypropylene, a polyamide-based resin such as nylon 6 and nylon 6,6, a polyester-based resin such as polyethylene terephthalate and polybutylene terephthalate, a polyetherketone, a polyethersulfone or an aromatic polyamide can be used. It is preferred that such a material for thermoplastic resin fibers is appropriately selected in combination with a matrix resin. In particular, thermoplastic resin fibers prepared using the same resin as a matrix resin, a resin having a compatibility with a matrix resin or a resin having a high adhesive property with a matrix resin are preferred, because the mechanical properties of a carbon fiber reinforced plastic are not lowered. For example, it is preferred that the thermoplastic resin fibers comprise at least one kind of fibers selected from the group consisting of polyamide fibers, polyphenylene sulfide fibers, polypropylene fibers, polyetheretherketone fibers and phenoxy resin fibers.

In the manufacture of stampable sheet, a press machine having a heating function can be used to carry out an impregnation step in which a thermoplastic resin as a matrix resin is impregnated into a carbon fiber sheet to form a stampable sheet. The press machine is not particularly restricted as long as it can control the temperature and pressure required for impregnation of the matrix resin. Examples of the press machine that can be used include a usual press machine having a planar die moving vertically and a so-called double belt press machine having a mechanism to run a pair of endless steel belts. In such an impregnation step, it is possible to employ a method in which, after the matrix resin in a sheet-like form such as a film, a nonwoven fabric or a woven fabric is prepared, it is laminated with a carbon fiber sheet, and the matrix resin is melted and impregnated into the carbon fiber sheet using the above-described press machine or the like while maintaining the laminated structure, or a method in which discontinuous thermoplastic resin fibers or thermoplastic resin particles are prepared using a matrix resin, the fibers or the particles are mixed at a step of making a carbon fiber sheet to prepare a carbon fiber sheet containing the matrix resin and either the discontinuous thermoplastic resin fibers or the thermoplastic resin particles, and the carbon fiber sheet is heated and pressed using the press machine or the like.

Hereinafter, Examples as well as Comparative Examples will be explained.

In the Examples and Comparative Examples, the orientation angle and the mechanical properties referred to therein were measured by respective methods described below, and carbon fiber bundles which will be described later were used.

(1) Measurement of Orientation Angle

Figure 3:
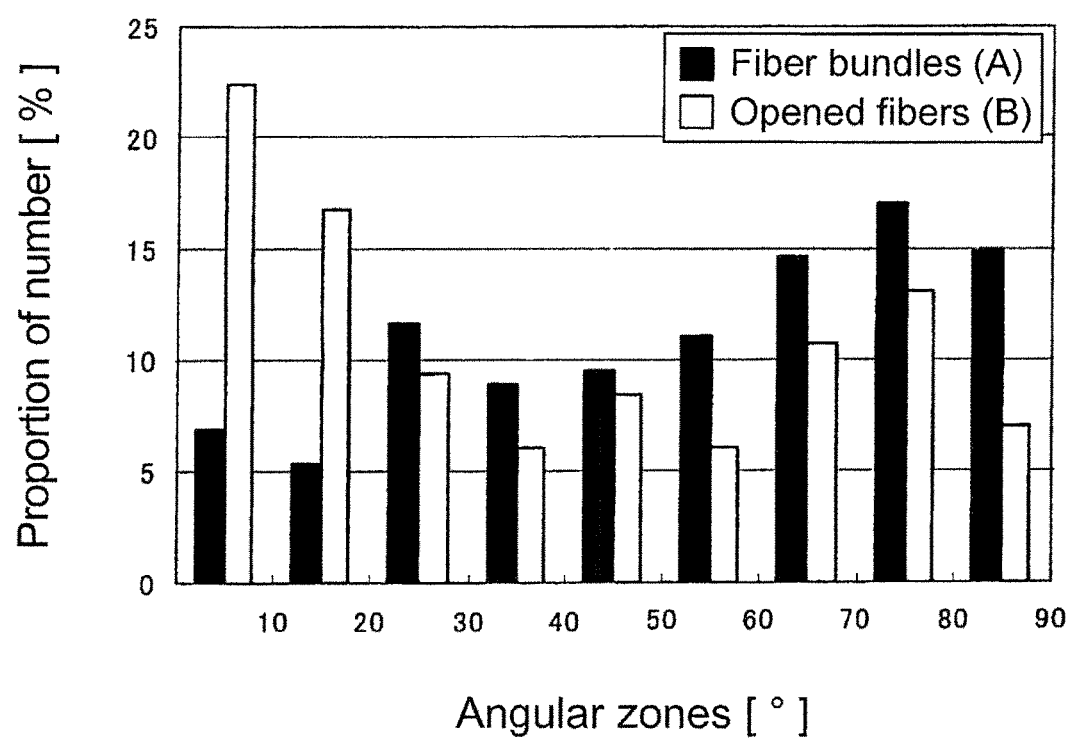
FIG. 3 is a distribution diagram showing proportions of numbers in respective angular zones in Example 1.

A sample with a size of 100 mm×100 mm was cut out from a stampable sheet, and thereafter, the sample was heated in an electric furnace heated at 500° C. for about 1 to 2 hours to burn off organic substances such as the matrix resin. After cooled down to room temperature, the remaining carbon fiber sheet was observed using a digital microscope supplied by Keyence Corporation. In this observation, the bundles having a fiber bundle length of 50 μm or greater are classified as fiber bundles (A), the bundles and fibers ranging from bundles having a bundle length of less than 50 μm to fibers obtained by opening to a single-fiber level are classified as opened fibers (B), and as shown in (A), (B) and (C) of FIG. 1, an orientation angle of a fiber bundle (A) or opened fiber (B) was measured as an angle (0° to 90°) formed by a linear line connecting the respective middle points of two short sides of the fiber bundle (A) or opened fiber (B) and a direction (0° direction) along which the opened fibers (B) have been oriented most. In each of the fiber bundles (A) or the opened fibers (B), the number N of measurements was 400. The measured fiber bundles (A) and opened fibers (B) were classified into the corresponding angular zones (for example, as shown in FIGS. 2 and 3, angular zones each having an angle of 10°) to obtain proportions of numbers of the fiber bundles (A) or the opened fibers (B) in respective angular zones.

In addition to this method, examples of a method that can be used include a method of directly measuring a carbon fiber sheet not formed into a stampable sheet yet, and a method in which a sample is cut out from the center of a molded article molded at a charge ratio of 90% or higher, then the sample is heated in an electric furnace to burn off organic substances such as the matrix resin and, thereafter, the sample of a carbon fiber sheet is collected and measured. It is preferred that the center of a molded article, as referred to herein, is a region where no flow end coming into contact with a die is contained and where the orientation of the fibers is not changed, and is also a portion that is not affected by three-dimensional projections and hollows such as ribs and bosses by which the orientation of the fibers is liable to be changed at the time of molding. For example, when a stampable sheet having a rectangular shape is molded, the above-described region can be exemplified by a region located at a distance of ('the length of the longitudinal side of the stampable sheet'×20%) or further from three-dimensional projections and hollows such as charge ends, ribs and bosses.

(2) Measurement of Mechanical Properties (Tensile Elastic Modulus and Tensile Strength)

Tensile elastic moduli and Tensile strengths were measured in respective angular directions according to JIS-K-7164. Further, the CV values (coefficient of variation [%]) of tensile elastic moduli and tensile strengths were also calculated. A CV value of less than 5% was ranked as 'good' which had a small variation, and a CV value of 5% or greater was ranked as 'bad' which had a large variation.

(3) Carbon Fiber Bundles which were Used

A continuous carbon fiber bundle (A) having a fiber diameter of 7 μm, a tensile elastic modulus of 230 GPa and a number of filaments of 24,000 was used to prepare a carbon fiber sheet.

Example 1

The carbon fiber bundle (A) was cut at a fiber length of 15 mm, the cut carbon fiber bundles and nylon 6 short fibers (fineness of single fiber: 1.7 dtex, cut length: 51 mm, number of crimps: 12 crests per 25 mm, rate of crimp: 15%) were mixed at a mass ratio of 85:15, and the mixture introduced into a carding machine. The web having come out was cross wrapped to form sheet-like carbon fiber aggregates comprising carbon fibers and nylon 6 fibers and having an areal weight of 100 g/cm$^2$. In the carbon fiber aggregates, when the number N of angular zones was set at 9 (the range of 0° to 90° was divided into 9 angular zones each having an angle of 10°), as shown in FIG. 3, a proportion of the number of opened fibers (the opened fibers (B)) aligned in an angular direction in an angular zone of 0° or greater and 10° or smaller to the number of all opened fibers in all angular zones was 22%, whereas a proportion of the number of fiber bundles (the fiber bundles (A)) aligned in an angular direction in this angular zone to the number of all fiber bundles in all angular zones was 7%; a proportion of the number of the opened fibers aligned in an angular direction in an angular zone of greater than 10° and 20° or smaller to the number of all opened fibers in all angular zones was 17%, whereas a proportion of the number of the fiber bundles aligned in an angular direction in this angular zone to the number of all fiber bundles in all angular zones was 5.5%; a proportion of the number of the opened fibers aligned in an angular direction in an angular zone of greater than 40° and 50° or smaller to the number of all opened fibers in all angular zones was 8%, whereas a proportion of the number of the fiber bundles aligned in an angular direction in this angular zone to the number of all fiber bundles in all angular zones was 10%; a proportion of the number of the opened fibers aligned in an angular direction in an angular zone of greater than 70° and 80° or smaller to the number of all opened fibers in all angular zones was 13%, whereas a proportion of the number of the fiber bundles aligned in an angular direction in this angular zone to the number of all fiber bundles in all angular zones was 17%; and a proportion of the number of the opened fibers aligned in an angular direction in an angular zone of greater than 80° and 90° or smaller to the number of all opened fibers in all angular zones was 7%, whereas a proportion of the number of the fiber bundles aligned in an angular direction in this angular zone to the number of all fiber bundles in all angular zones was 15%.

At that time, a proportion Y of discontinuous carbon fiber bundles (C) having an Mn/(Ln×D) of $8.5\times10^{-1}$ (mg/mm$^2$) or greater in discontinuous carbon fiber bundles to the total weight of the discontinuous carbon fiber bundles was 43 (wt %).

Twelve sheets of the carbon fiber aggregates were stacked to form a structure in which the respective winding directions of all the sheet-like carbon fiber aggregates were aligned in the same direction and, further, after a nylon resin melt blow nonwoven fabric ("CM1001," ηr=2.3, supplied by Toray Industries, Inc.) was stacked to the whole of the stacked carbon fiber aggregates so that the volume ratio of the carbon fibers to the thermoplastic resin became 30:70, the whole was nipped by stainless plates, and after preheating at 250° C. for 90 seconds, it was hot pressed at 250° C. for 180 seconds while being applied with a pressure of 2.0 MPa. Then, it was cooled down to 50° C. at the pressed condition to obtain a flat plate (stampable sheet) of carbon fiber composite material having a thickness of 2 mm. When the tensile elastic moduli and the tensile strengths were measured in respective angular directions spaced every 15° starting from the 0° direction of the surface layer of the obtained flat plate, with regard to average value of tensile elastic moduli, 'an average value of tensile elastic moduli in an angular direction in which the average value exhibits a maximum value/an average value of tensile elastic moduli in an angular direction in which the average value exhibits a minimum value' was 1.08; with regard to average value of tensile strengths, 'an average value of tensile strengths in an angular zone in which the average value exhibits a maximum value/an average value of tensile strengths in an angular zone in which the average value exhibits a minimum value' was 1.10; and both the tensile elastic moduli and the tensile strengths had a CV value of less than 5%.

Example 2

Figure 4:
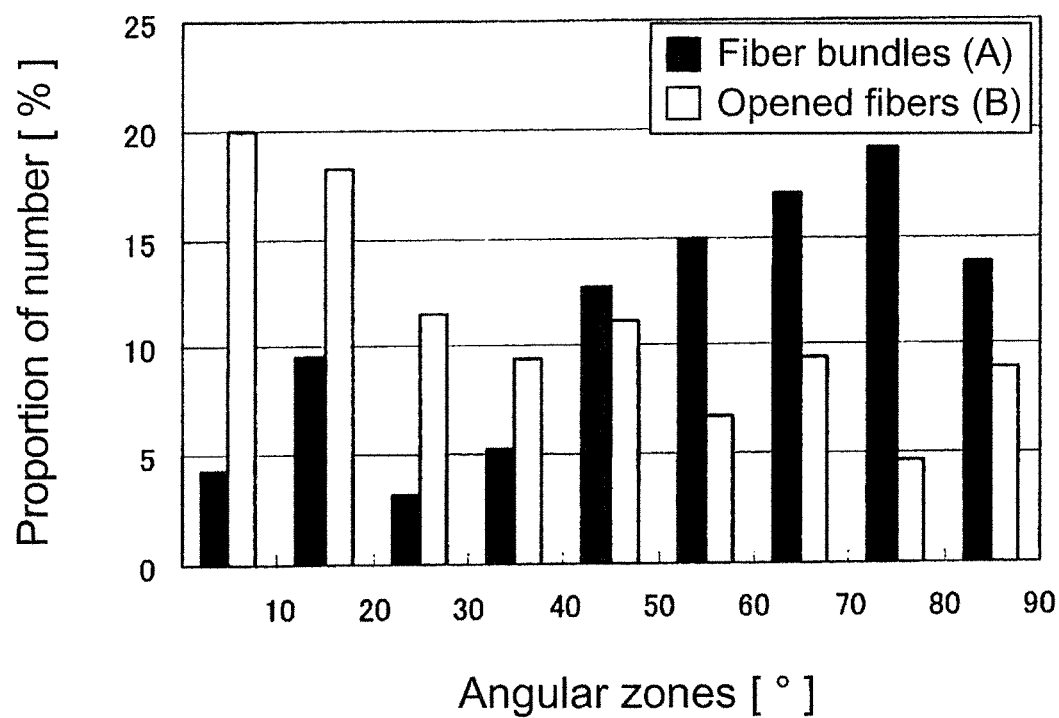
FIG. 4 is a distribution diagram showing proportions of numbers in respective angular zones in Example 2.

Sheet-like carbon fiber aggregates were obtained in a manner similar to Example 1 except that in the resultant sheet-like carbon fiber aggregates, as shown in FIG. 4, when the number N of angular zones was set at 9, a proportion of the number of the opened fibers aligned in an angular direction in an angular zone of 0° or greater and 10° or smaller to the number of all opened fibers in all angular zones was 20%, whereas a proportion of the number of the fiber bundles aligned in an angular direction in this angular zone to the number of all fiber bundles in all angular zones was 4%; a proportion of the number of the opened fibers aligned in an angular direction in an angular zone of greater than 10° and 20° or smaller to the number of all opened fibers in all angular zones was 18%, whereas a proportion of the number of the fiber bundles aligned in an angular direction in this angular zone to the number of all fiber bundles in all angular zones was 9.5%; a proportion of the number of the opened fibers aligned in an angular direction in an angular zone of greater than 40° and 50° or smaller to the number of all opened fibers in all angular zones was 11%, whereas a proportion of the number of the fiber bundles aligned in an angular direction in this angular zone to the number of all fiber bundles in all angular zones was 13%; a proportion of the number of the opened fibers aligned in an angular direction in an angular zone of greater than 70° and 80° or smaller to the number of all opened fibers in all angular zones was 4.5%, whereas a proportion of the number of the fiber bundles aligned in an angular direction in this angular zone to the number of all fiber bundles in all angular zones was 19%; a proportion of the number of the opened fibers aligned in an angular direction in an angular zone of greater than 80° and 90° or smaller to the number of all opened fibers in all angular zones was 9%, whereas a proportion of the number of the fiber bundles aligned in an angular direction in this angular zone to the number of all fiber bundles in all angular zones was 14%; and the areal weight of the sheet-like carbon fiber aggregates was 100 g/cm$^2$.

At that time, a proportion Y of discontinuous carbon fiber bundles (C) having an Mn/(Ln×D) of $8.5\times10^{-1}$ (mg/mm$^2$) or greater in discontinuous carbon fiber bundles to the total weight of the discontinuous carbon fiber bundles was 35 (wt %).

Twelve sheets of the carbon fiber aggregates were stacked to form a structure in which the respective winding directions of all the sheet-like carbon fiber aggregates were aligned in the same direction and, further, after a nylon resin melt blow nonwoven fabric ("CM1001," ηr=2.3, supplied by Toray Industries, Inc.) was stacked to the whole of the stacked carbon fiber aggregates so that the volume ratio of the carbon fibers to the thermoplastic resin became 30:70, the whole was nipped by stainless plates, and after preheating at 250° C. for 90 seconds, it was hot pressed at 250° C. for 180 seconds while being applied with a pressure of 2.0 MPa. Then, it was cooled down to 50° C. at the pressed condition to obtain a flat plate (stampable sheet) of carbon fiber composite material having a thickness of 2 mm. When the tensile elastic moduli and the tensile strengths were measured in respective angular directions spaced every 15° starting from the 0° direction of the surface layer of the obtained flat plate, with regard to average value of tensile elastic moduli, 'an average value of tensile elastic moduli in an angular direction in which the average value exhibits a maximum value/an average value of tensile elastic moduli in an angular direction in which the average value exhibits a minimum value' was 1.10; with regard to average value of tensile strengths, 'an average value of tensile strengths in an angular zone in which the average value exhibits a maximum value/an average value of tensile strengths in an angular zone in which the average value exhibits a minimum value' was 1.07; and both the tensile elastic moduli and the tensile strengths had a CV value of less than 5%.

Comparative Example 1

Figure 5:
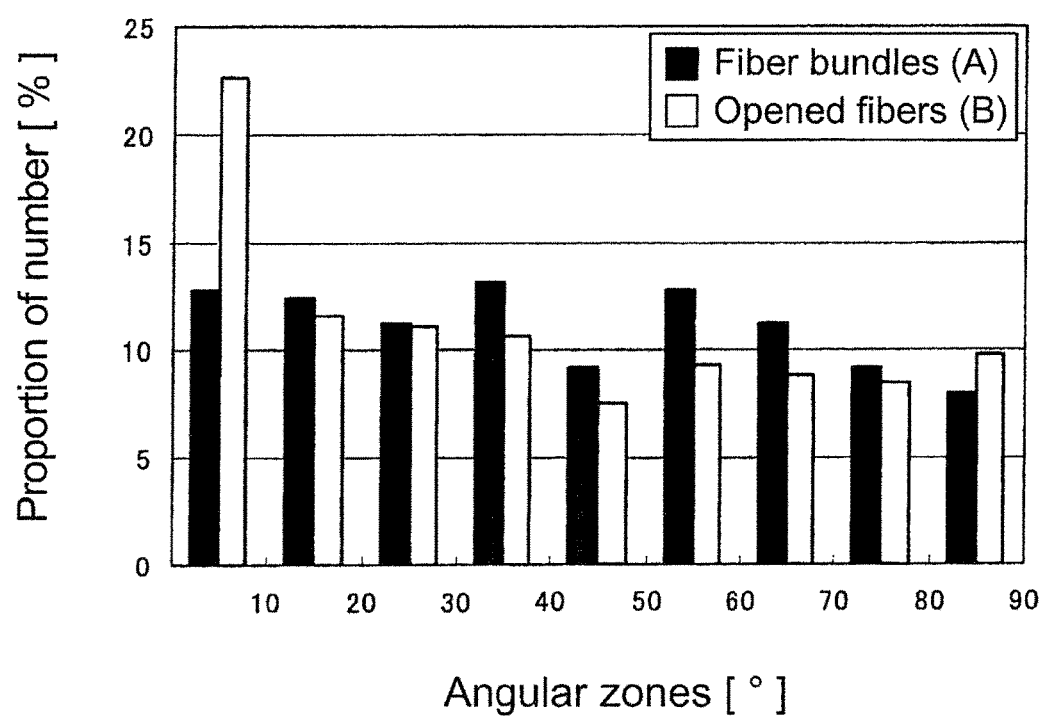
FIG. 5 is a distribution diagram showing proportions of numbers in respective angular zones in Comparative Example 1.

Sheet-like carbon fiber aggregates were obtained in a manner similar to Example 1 except that in the resultant sheet-like carbon fiber aggregate, as shown in FIG. 5, when the number N of angular zones was set at 9, a proportion of the number of the opened fibers aligned in an angular direction in an angular zone of 0° or greater and 10° or smaller to the number of all opened fibers in all angular zones was 23%, whereas a proportion of the number of the fiber bundles aligned in an angular direction in this angular zone to the number of all fiber bundles in all angular zones was 13%; a proportion of the number of the opened fibers aligned in an angular direction in an angular zone of greater than 10° and 20° or smaller to the number of all opened fibers in all angular zones was 12%, whereas a proportion of the number of the fiber bundles aligned in an angular direction in this angular zone to the number of all fiber bundles in all angular zones was 13%; a proportion of the number of the opened fibers aligned in an angular direction in an angular zone of greater than 40° and 50° or smaller to the number of all opened fibers in all angular zones was 8%, whereas a proportion of the number of the fiber bundles aligned in an angular direction in this angular zone to the number of all fiber bundles in all angular zones was 9%; a proportion of the number of the opened fibers aligned in an angular direction in an angular zone of greater than 70° and 80° or smaller to the number of all opened fibers in all angular zones was 8.5%, whereas a proportion of the number of the fiber bundles aligned in an angular direction in this angular zone to the number of all fiber bundles in all angular zones was 9%; and, a proportion of the number of the opened fibers aligned in an angular direction in an angular zone of greater than 80° and 90° or smaller to the number of all opened fibers in all angular zones was 10%, whereas a proportion of the number of the fiber bundles aligned in an angular direction in this angular zone to the number of all fiber bundles in all angular zones was 8%.

At that time, a proportion Y of discontinuous carbon fiber bundles (C) having an $Mn/(Ln \times D)$ of $8.5 \times 10^{-1}$ ($mg/mm^2$) or greater in discontinuous carbon fiber bundles to the total weight of the discontinuous carbon fiber bundles was 23 (wt %).

The obtained sheet-like carbon fiber aggregates were molded in a manner similar to Example 1 to obtain a flat plate of carbon fiber composite material having a thickness of 2 mm. When the tensile elastic moduli and the tensile strengths were measured in respective angular directions spaced every 15 degrees starting from the 0° direction of the surface layer of the obtained flat plate, with regard to average value of tensile elastic moduli, 'an average value of tensile elastic moduli in an angular direction in which the average value exhibits a maximum value/an average value of tensile elastic moduli in an angular direction in which the average value exhibits a minimum value' became greater than 1.2, and with regard to average value of tensile strengths, 'an average value of tensile strengths in an angular zone in which the average value exhibits a maximum value/an average value of tensile strengths in an angular zone in which the average value exhibits a minimum value' became greater than 1.2.

INDUSTRIAL APPLICATIONS

The stampable sheet can be applied to molding of any CFRP for which an excellent isotropy in mechanical properties and an excellent flowability at the time of molding are required.

The invention claimed is:

1. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein a principal orientation angle of said fiber bundles (A) at which a distribution showing said proportion of the number of said fiber bundles (A) in each angular zone to the number of all fiber bundles (A) in all angular zones exhibits a highest value is in a range of a 60° direction to said 90° direction relative to said 0° direction along which said opened fibers (B) have been oriented most.

2. The stampable sheet according to claim 1, wherein said total number N of said angular zones is 6 to 12.

3. The stampable sheet according to claim 2, wherein said total number N of said angular zones is 9.

4. The stampable sheet according to claim 1, wherein said carbon fiber sheet is prepared by a carding method.

5. The stampable sheet according to claim 1, wherein said discontinuous carbon fibers comprise carbon fibers having a fiber length of 2 mm or more and less than 20 mm.

6. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein a proportion of the number of said fiber bundles (A) in an angular zone including said 0° direction to the number of all fiber bundles (A) in all angular zones is 0 to 1.0×90/N %, and a proportion of the number of said opened fibers (B) in the angular zone including said 0° direction to the number of all opened fibers (B) in all angular zones is 1.0×90/N to 3.0×90/N %.

7. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein a proportion of the number of said fiber bundles (A) in an angular zone including said 90° direction to the number of all fiber bundles (A) in all angular zones is 1.0×90/N to 3.0×90/N %, and a proportion of the number of said opened fibers (B) in the angular zone including said 90° direction to the number of all opened fibers (B) in all angular zones is 0 to 1.0×90/N %.

8. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein, when tensile elastic moduli are measured in respective angular directions, with regard to average value of tensile elastic moduli, 'an average value of tensile elastic moduli in an angular direction in which the average value exhibits a maximum value/an average value of tensile elastic moduli in an angular direction in which the average value exhibits a minimum value' is 1.2 to 1.0.

9. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein, when tensile strengths are measured in respective angular directions, with regard to average value of tensile strengths, 'an average value of tensile strengths in an angular direction in which the average value exhibits a maximum value/an average value of tensile strengths in an angular direction in which the average value exhibits a minimum value' is 1.2 to 1.0.

10. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein a proportion Y of carbon fiber bundles (C) having an Mn/(Ln×D) of $8.5 \times 10^{-1}$ (mg/mm$^2$) or greater in discontinuous carbon fiber bundles to the total weight of said discontinuous carbon fiber bundles is 30≤Y<90 (wt %), wherein Mn: weight of carbon fiber bundles (mg), Ln: fiber length of carbon fibers (mm), D: fiber diameter of carbon fibers (mm).

11. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein a proportion of the number of said fiber bundles (A) in an angular zone including a 45° direction to the number of all fiber bundles (A) in all angular zones is 0.5×90/N to 1.5×90/N %, and a proportion of the number of said opened fibers (B) in the angular zone including said 45° direction to the number of all opened fibers (B) in all angular zones is 0.5×90/N to 1.5×90/N %.

12. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein, when tensile strengths are measured in respective angular directions, a CV value of tensile strengths is 5 to 0.1%.

13. A stampable sheet comprising a resin and a carbon fiber sheet constituted of fiber bundles of discontinuous carbon fibers, wherein said carbon fiber sheet comprises fiber bundles (A) having a bundle width of 50 μm or greater and opened fibers (B) ranging from fiber bundles having a bundle width less than 50 μm to fibers obtained by opening to a single-fiber level, and is a carbon fiber sheet in which, when a direction along which said opened fibers (B) have been oriented most is taken as a 0° direction and a range of from said 0° direction to a 90° direction is divided into a predetermined plurality of angular zones (a total number N of said angular zones: N≥3), a distribution curve showing a proportion of a number of said fiber bundles (A) in each angular zone to a number of all fiber bundles (A) in all angular zones and a distribution curve showing a proportion of a number of said opened fibers (B) in each angular zone to a number of all opened fibers (B) in all angular zones are reverse to each other in terms of gradient viewed as a whole in a range of from said 0° direction to said 90° direction, wherein, when tensile elastic moduli are measured in respective angular directions, a CV value of tensile elastic moduli is 5 to 0.1%.

* * * * *